（12） United States Patent
Banno et al.

(10) Patent No.: US 9,397,581 B2
(45) Date of Patent: Jul. 19, 2016

(54) POWER CONVERSION APPARATUS THAT PROVIDES A RELEASE PATH FOR INDUCTIVE ENERGY ACCUMULATED IN AN INDUCTIVE LOAD

(71) Applicant: FUJI ELECTRIC CO., LTD., Kawasaki-shi (JP)

(72) Inventors: Seitaro Banno, Hachioji (JP); Satoru Fujita, Akishima (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 102 days.

(21) Appl. No.: 14/474,872

(22) Filed: Sep. 2, 2014

(65) Prior Publication Data

US 2014/0368173 A1    Dec. 18, 2014

Related U.S. Application Data

(63) Continuation of application No. PCT/JP2012/003259, filed on May 18, 2012.

(51) Int. Cl.
*H02M 5/293* (2006.01)
*H02M 5/257* (2006.01)

(52) U.S. Cl.
CPC ............ *H02M 5/293* (2013.01); *H02M 5/2573* (2013.01); *H02M 2005/2932* (2013.01)

(58) Field of Classification Search
CPC ...................................................... H02M 5/293
See application file for complete search history.

(56) References Cited

U.S. PATENT DOCUMENTS

| | | | |
|---|---|---|---|
| 2007/0052397 | A1 | 3/2007 | Thompson et al. |
| 2011/0026285 | A1* | 2/2011 | Kawashima ........ H02M 1/4208 363/127 |
| 2012/0127765 | A1* | 5/2012 | Maruyama .............. H02J 5/005 363/126 |
| 2013/0235625 | A1 | 9/2013 | Yamada |

FOREIGN PATENT DOCUMENTS

| | | |
|---|---|---|
| JP | H09-219987 A | 8/1997 |
| JP | 2001-100850 A | 4/2001 |
| JP | 2003-230276 A | 8/2003 |
| JP | 2003-230277 A | 8/2003 |
| JP | 2006-311726 A | 11/2006 |
| WO | WO-2012-067167 A1 | 5/2012 |

* cited by examiner

*Primary Examiner* — Emily P Pham
(74) *Attorney, Agent, or Firm* — Rabin & Berdo, P.C.

(57) ABSTRACT

A power conversion apparatus includes first, second, third, and fourth switching elements. In a first period, the second and third switching elements are switched ON, and first and fourth switching elements are alternately switched ON/OFF. In a second period, the first and fourth switching elements are switched ON, and the second and third switching elements are alternately switched ON/OFF. In a third period, the first and second switching elements are switched ON, and the third and fourth switching elements are switched OFF. The power conversion apparatus provides a release path for inductive energy accumulated in a reactor.

9 Claims, 12 Drawing Sheets

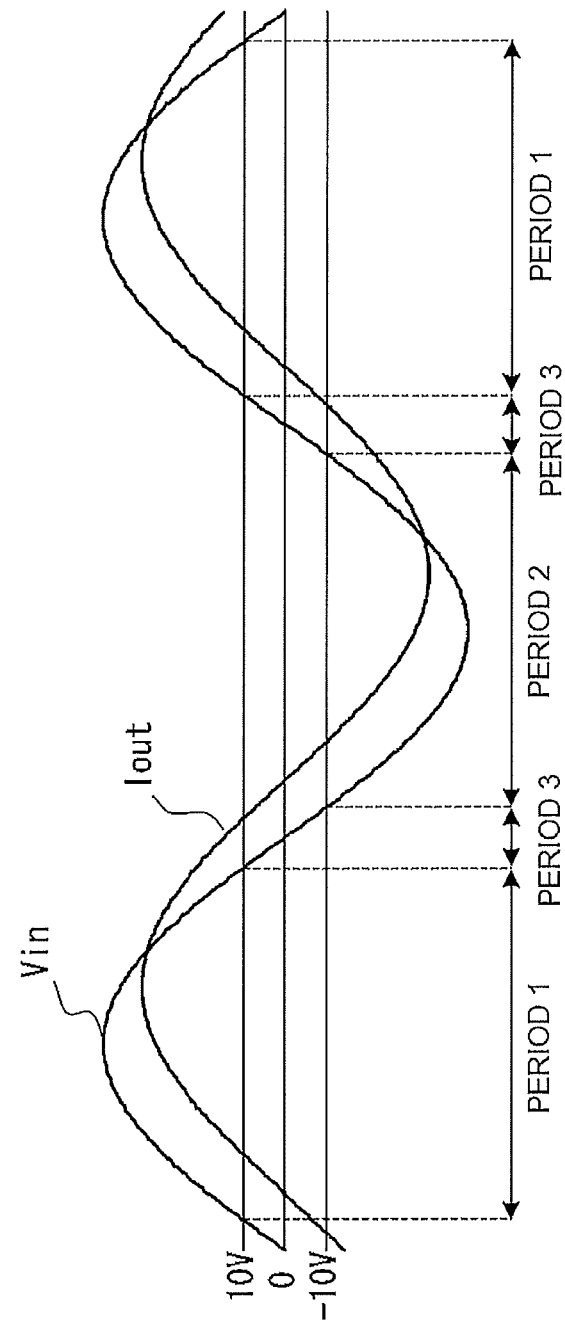

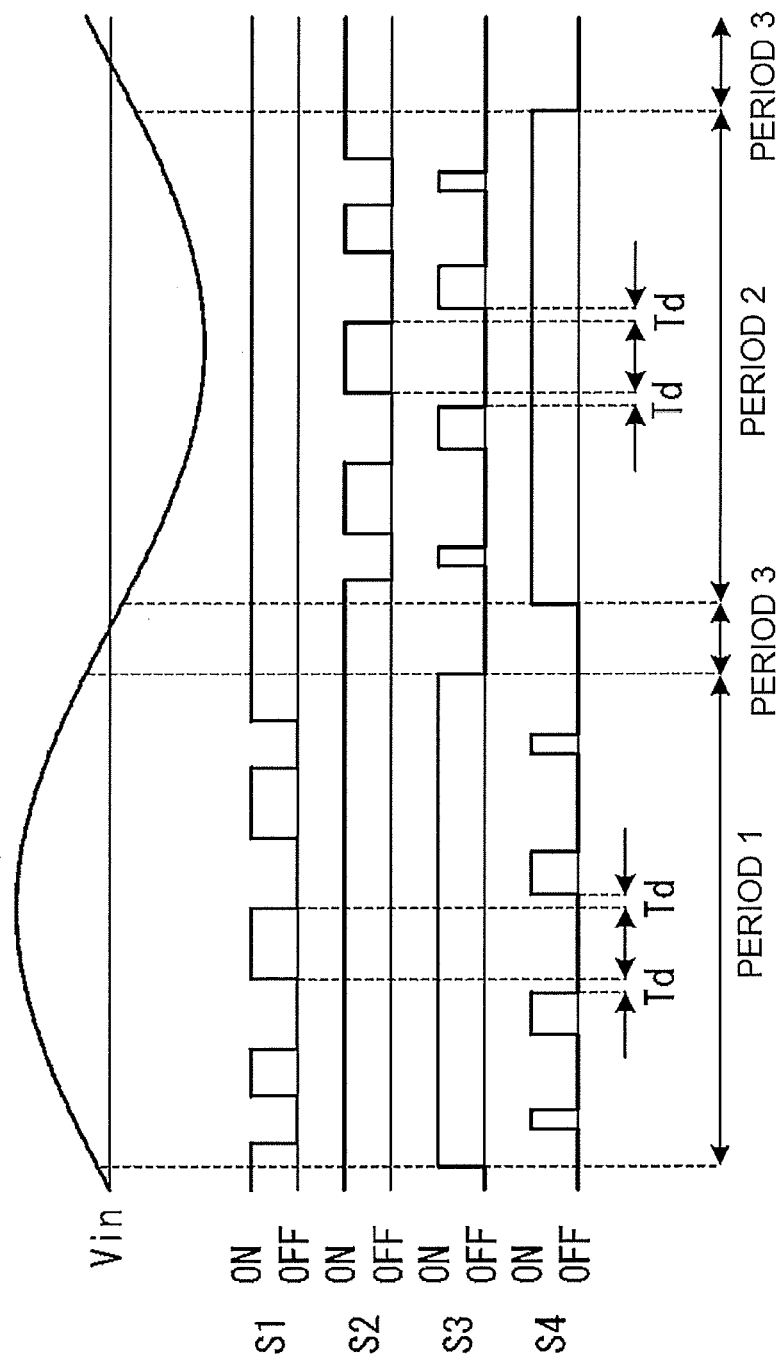

US 9,397,581 B2

POWER CONVERSION APPARATUS THAT PROVIDES A RELEASE PATH FOR INDUCTIVE ENERGY ACCUMULATED IN AN INDUCTIVE LOAD

CROSS-REFERENCE TO RELATED APPLICATIONS

This application is a bypass continuation application of International Application number PCT/JP2012/003259, filed on May 18, 2012 and designating the United States. The disclosure of this earlier application is hereby incorporated herein by reference.

TECHNICAL FIELD

The present invention relates to a power conversion apparatus that steps down or up the voltage of an AC power source and outputs the resultant AC voltage.

BACKGROUND ART

Step-down and step-up AC choppers are known as power conversion apparatuses that step down or up the voltage of an AC power source and output the resultant AC voltage. FIG. 11 is an explanatory drawing showing a single-phase step-down AC chopper disclosed in Patent Document 1 (identified below).

In the figure, the reference numeral 1 stands for a single-phase AC power source, 2 and 3—bidirectional switches, and 4—a load.

The bidirectional switch 2 is a circuit in which switching elements S1, S2, each having diodes connected reversely in parallel, are connected reversely in series. The bidirectional switch 3 is a circuit in which switching elements S3, S4, each having diodes connected reversely in parallel, are connected reversely in series. The bidirectional switch 2 and the bidirectional switch 3 are connected in series and connected to both terminals of the single-phase AC power source 1. In the load 4, a resistor R and a reactor L are connected in series. The load 4 is connected to both terminals of the bidirectional switch 3.

In this configuration, the bidirectional switch 2 and the bidirectional switch 3 are repeatedly and alternately ON/OFF operated on the basis of pulse-width-modulated gate signals. The gate signals of the bidirectional switch 2 and the bidirectional switch 3 are provided with a dead time such that prevents the two bidirectional switches from being simultaneously switched ON at an ON/OFF switching timing thereof. With such operation, the predetermined AC voltage obtained by stepping down the voltage of the AC power source 1 is applied to the load 4.

FIG. 12 is an explanatory drawing showing the single-phase step-up AC chopper disclosed in Patent Document 1.

In the figure, the reference numeral 1 stands for a single-phase AC power source, 2 and 3—bidirectional switches, 4—a load, 5—a reactor, 6—a capacitor.

The configuration of the bidirectional switch 2 and the bidirectional switch 3 is the same as in the above-described step-down AC chopper. The serial circuit of the reactor 5 and the bidirectional switch 2 is connected to both terminals of the AC power source 1. The serial circuit of the bidirectional switch 3 and the capacitor 6 is connected to both terminals of the bidirectional switch 2. The load 4 is connected to both terminals of the capacitor 6.

In such a configuration, the bidirectional switch 2 and the bidirectional switch 3 are repeatedly and alternately ON/OFF operated on the basis of pulse-width-modulated gate signals. A dead time is provided to the gate signals of the bidirectional switch 2 and the bidirectional switch 3 in order to prevent the two switching elements from being simultaneously switched ON at the ON/OFF switching timing thereof. With such operation, the predetermined AC voltage obtained by stepping up the voltage of the AC power source 1 is applied to the load 4.

However, in the case of a step-down AC chopper, where the bidirectional switch 2 and the bidirectional switch 3 are simultaneously switched OFF in the dead time, the path for releasing the inductive energy accumulated in the reactor L is cut off. At this time, a surge voltage is generated at both terminals of the reactor L. In the case of a step-up AC chopper, where the bidirectional switch 2 and the bidirectional switch 3 are simultaneously switched OFF in the dead time, the path for releasing the inductive energy accumulated in the reactor 5 is cut off. At this time, a surge voltage is generated at both terminals of the reactor 5. The surge voltage generated in the reactor L or reactor 5 can lead to the breakdown of the bidirectional switches 2 and 3.

Patent Document 1 discloses a method for inhibiting the occurrence of such surge voltage. According to Patent Document 1, three periods are provided for individually ON/OFF switching the switching elements S1 to S4, which constitute the bidirectional switches 2 and 3, according to the polarity of a load current Io or power source current Iin when the bidirectional switches 2 and 3 are ON/OFF switched. Each of those three periods can constitute a release path for the inductive energy accumulated in the reactor L or reactor 5. As a result, the occurrence of the surge voltage is inhibited.

Patent Document 1: Japanese Patent Application Publication No. 2003-230277.

DISCLOSURE OF THE INVENTION

However, with the technique disclosed in Patent Document 1, control signals should be generated for ON/OFF switching the switching elements S1 to S4 according to the polarity of the load current Io or power source current Iin. Since the bidirectional switches 2 and 3 are ON/OFF switched, for example, by pulse-width modulation control, a ripple component is included in the load current Io or power source current Iin. Therefore, the polarity of the load current Io or power source current Iin is difficult to detect accurately in the vicinity of the zero cross of the current. Where the circuit constraint is erroneously detected, a surge voltage is generated by the inductive energy accumulated in the reactor L or reactor 5.

Further, when the load is light, the load current Io and power source current Iin decrease. Therefore, the polarity of the load current Io or power source current Iin is even more difficult to detect when the load is light.

Thus, with the AC chopper using the technique disclosed in Patent Document 1, the surge voltage generated by the reactor L or reactor 5 close to the zero cross of the load current Io or power source current Iin sometimes cannot be inhibited, or a complex control circuit should be used to inhibit the surge voltage.

Further, with the technique disclosed in Patent Document 1, three periods are provided for individually ON/OFF switching the switching elements S1 to S4. Therefore, the number of dead time close to the zero cross of the power source voltage should be increased by a factor of three over that in the usual case. The necessity to increase the number of dead time inhibits the formation of harmonics in the AC chopper.

The present invention has been created to resolve the problems inherent to the related art. Thus, it is an object of the present invention to provide an AC chopper such that prevents the surge generated in the reactor L or reactor 5 even when the electric current includes a ripple component.

In order to attain the abovementioned object, the first invention provides a power conversion apparatus in which an AC voltage, obtained by alternately ON/OFF switching first and second bidirectional switches connected in series to both terminals of an AC power source, is supplied to a load connected to both terminals of the second bidirectional switch. In the power conversion apparatus, the first bidirectional switch is configured by connecting a first switching element and a second switching element in series or in parallel, and the second bidirectional switch is configured by connecting a third switching element and a fourth switching element in series or in parallel. When a voltage of the AC power source is between a first reference voltage, which is higher than zero, and a second reference voltage, which is lower than zero, the voltage of the AC power source is supplied to the load by switching ON the first and second switching elements of the first bidirectional switch and switching OFF the third and fourth switching elements of the second bidirectional switch.

The second invention provides the power conversion apparatus according to the first invention, in which a voltage period of the AC power source is divided into a first period in which the voltage of the AC power source is equal to or higher than the first reference voltage, a second period in which the voltage of the AC power source is equal to or lower than the second reference voltage, and a third period in which the voltage of the AC power source is between the first reference voltage and the second reference voltage. In the power conversion apparatus, in each divided period, the voltage of the AC power source is stepped down to a predetermined AC voltage, and supplied to the load by performing ON/OFF control of the first to fourth switching elements.

More specifically, in the power conversion apparatus, in the first period, the second and third switching elements are switched ON, and the first and fourth switching elements are alternately switched ON/OFF. In the power conversion apparatus, in the second period, the first and fourth switching elements are switched ON, and the second and third switching elements are alternately switched ON/OFF. In the power conversion apparatus, in the third period, the first and second switching elements are switched ON, and the third and fourth switching elements are switched OFF.

The third invention provides the power conversion apparatus according to the second invention, in which switching from the first period to the third period and switching from the second period to the third period are performed when the first and second switching element are simultaneously ON.

The fourth invention provides a power conversion apparatus in which a reactor and a second bidirectional switch are connected in series to both terminals of an AC power source, a first bidirectional switch and a capacitor are connected in series to both terminals of the second bidirectional switch, and an AC voltage, obtained by alternately ON/OFF switching the first and second bidirectional switches, is supplied to a load connected to both terminals of the capacitor. In the power conversion apparatus, the first bidirectional switch is configured by connecting a first switching element and a second switching element in series or in parallel, and the second bidirectional switch is configured by connecting a third switching element and a fourth switching element in series or in parallel. Further, in the power conversion apparatus when a voltage of the AC power source is between a first reference voltage and a second reference voltage, which is lower than the first reference voltage, the voltage of the AC power source is supplied to the load by switching ON the first bidirectional switch and switching OFF the second bidirectional switch. Further, the first reference voltage is higher than zero, and a second reference voltage is lower than zero.

The fifth invention provides the power conversion apparatus according to the fourth invention, in which a voltage period of the AC power source is divided into a fourth period in which the voltage of the AC power source is equal to or higher than the first reference voltage, a fifth period in which the voltage of the AC power source is equal to or lower than the second reference voltage, and a sixth period in which the voltage of the AC power source is between the first reference voltage and the second reference voltage. In the power conversion apparatus, in each divided period, the voltage of the AC power source is stepped up to a predetermined AC voltage, and supplied to the load by performing ON/OFF control of the first to fourth switching elements in a predetermined mode.

More specifically, in the power conversion apparatus, in the fourth period, the first and fourth switching elements are switched ON, and the second and third switching elements are alternately switched ON/OFF. In the power conversion apparatus, in the fifth period, the second and third switching elements are switched ON, and the first and fourth switching elements are alternately switched ON/OFF. In the power conversion apparatus, in the sixth period, the first and second switching elements are switched ON, and the third and fourth switching elements are switched OFF.

The sixth invention provides the power conversion apparatus according to the fifth invention, in which switching from the fourth period to the sixth period and switching from the fifth period to the sixth period are performed when the first and second switching element are simultaneously ON.

The seventh invention provides a power conversion apparatus in which a three-phase AC power source and a three-phase load are V-connected in use of two power conversion apparatuses according to any one of the first to sixth inventions.

The eighth invention provides a power conversion apparatus in which a three-phase AC power source and a three-phase load are Y-connected in use of three power conversion apparatuses according to any one of the first to sixth inventions.

The power conversion apparatus using the present invention is an AC chopper which is provided with two bidirectional switches, steps down or up the voltage of an AC power source, and supplies the resultant voltage to a load.

When the power conversion apparatus is a step-down AC chopper, the voltage period of the AC power source is divided into the first to third periods and the first to fourth switching elements are ON/OFF controlled.

In the first period, the second and third switching elements are in the ON state and the first and fourth switching elements are alternately switched ON/OFF. In this period, the circuit current is commutated to the third switching element following the OFF operation of the first switching element. In the second period, the first and fourth switching elements are in the ON state, and the second and third switching elements are alternately switched ON/OFF. In this period, the circuit current is commutated to the fourth switching element following the OFF operation of the second switching element. In the third period, the first and second switching elements are in the ON state, and the third and fourth switching elements are in the OFF state. In this period, the circuit current flows through the first or second switching element.

When the power conversion apparatus is a step-up AC chopper, the voltage period of the AC power source is divided into the fourth to sixth periods and the first to fourth switching elements are ON/OFF controlled.

In the fourth period, the first and fourth switching elements are in the ON state and the second and third switching elements are alternately switched ON/OFF. In this period, the circuit current is commutated to the first switching element following the OFF operation of the third switching element. In the fifth period, the second and third switching elements are in the ON state, and the first and fourth switching elements are alternately switched ON/OFF. In this period, the circuit current is commutated to the second switching element following the OFF operation of the fourth switching element. In the sixth period, the first and second switching elements are in the ON state, and the third and fourth switching elements are in the OFF state. In this period, the circuit current flows through the first or second switching element.

The power conversion apparatus using the present invention can configure a release path for inductive energy accumulated in the reactor in any control period. Therefore, the power conversion apparatus using the present invention can inhibit the surge occurring in the reactor.

BRIEF DESCRIPTION OF THE DRAWINGS

FIG. 3 is an explanatory drawing showing the relationship between the voltage Vin and the periods 1 to 3.

FIG. 4 is an explanatory drawing showing the relationship between the periods 1 to 3 and the operation of switching elements.

BEST MODES FOR CARRYING OUT THE INVENTION

The embodiments of the power conversion apparatus using the present invention will be explained below in greater detail with reference to FIGS. 1 to 10.

Figure 1:
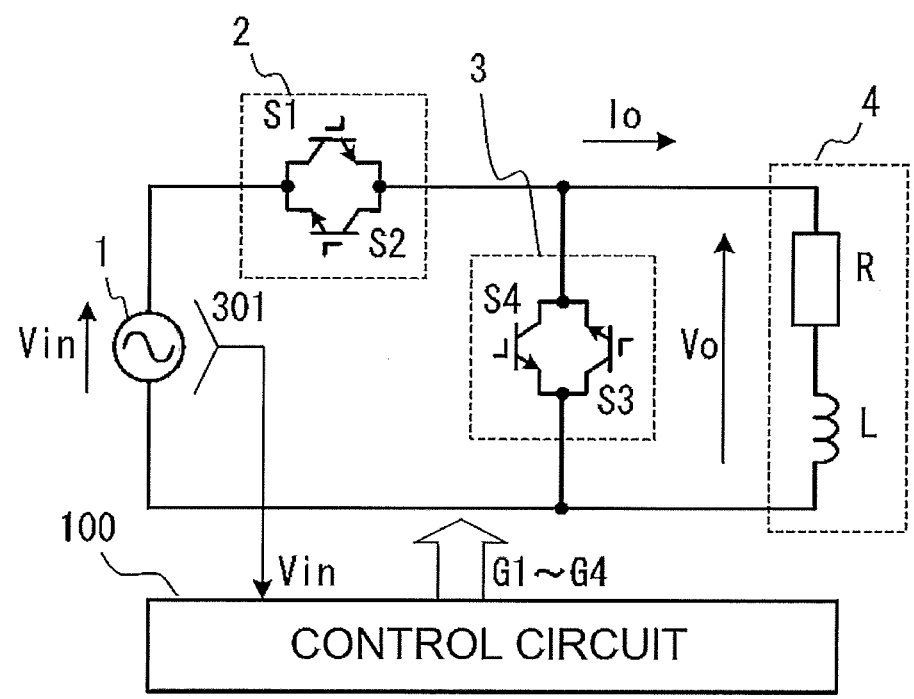
FIG. 1 is an explanatory drawing showing the first embodiment of the present invention.

FIG. 1 illustrates the first embodiment of the power conversion apparatus using the present invention.

In the figure, the reference numeral 1 stands for a single-phase AC power source, 2 and 3—bidirectional switches, 4—a load, and 100—a control circuit. The power conversion apparatus according to the present embodiment is a step-down AC chopper that supplies a voltage Vo, which is obtained by stepping down a voltage Vin of the single-phase AC power source 1, to the load.

The bidirectional switch 2 (first bidirectional switch) is a circuit in which a switching element S1 (first switching element) and a switching element S2 (second switching element) are connected reversely in parallel. The collector terminal side of the switching element S1 serves as a first terminal of the bidirectional switch 2, and the emitter terminal side of the switching element S1 serves as a second terminal of the bidirectional switch 2.

The bidirectional switch 3 (second bidirectional switch) is a circuit in which a switching element S3 (third switching element) and a switching element S4 (fourth switching element) are connected reversely in parallel. The collector terminal side of the switching element S4 serves as a first terminal of the bidirectional switch 3, and the emitter terminal side of the switching element S4 serves as a second terminal of the bidirectional switch 3.

The switching elements S1 to S4 shown in the figure are IGBT (Insulated Gate Bipolar Transistors) having a reverse blocking voltage.

Figure 2A:
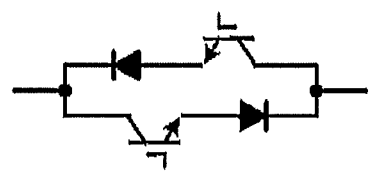
FIGS. 2A, 2B, and 2C are explanatory drawings showing embodiments of a bidirectional switching element.
Figure 2B:
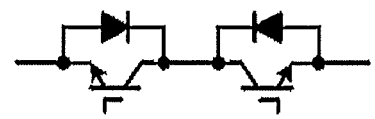
Figure 2C:
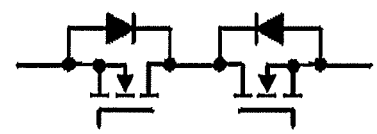

However, the bidirectional switches 2 and 3 are not limited to the abovementioned configuration. For example, the bidirectional switches 2 and 3 may be also configured by connecting reversely in parallel two circuits each having an IGBT which is not provided with a reverse blocking voltage and a diode connected in series, as shown in FIG. 2A. Further, the bidirectional switches 2 and 3 may be also configured by connecting reversely in series two circuits each having an IGBT which is not provided with a reverse blocking voltage and a diode connected reversely in parallel, as shown in FIG. 2B. The bidirectional switches 2 and 3 may be also configured as two IGBT bidirectional switch elements in which diodes are connected reversely in parallel by connecting reversely in series two circuits each having a MOSFET (Metal Oxide Semiconductor Field Effect Transistor) and a diode connected reversely in parallel, as shown in FIG. 2C.

The bidirectional switches can be also configured in the same manner in all other embodiments described hereinbelow.

The bidirectional switch 2 and the bidirectional switch 3 are connected in series to two terminals of the AC power source 1. More specifically, the second terminal of the bidirectional switch 2 and the first terminal of the bidirectional switch 3 are connected. The first terminal of the bidirectional switch 2 is connected to one terminal of the AC power source 1, and the second terminal of the bidirectional switch 3 is connected to the other terminal of the AC power source 1.

The load 4 is connected to both terminals of the bidirectional switch 3. The load 4 is a circuit in which a resistor R and a reactor L are connected in series. The reactor L includes the inductance component of the reactor R or the inductance component of a wiring.

The control circuit 100 receives an input of the voltage Vin of the AC power source 1 detected by a voltage detector 301. The control circuit 100 generates gate signals G1 to G4 for ON/OFF switching the switching elements S1 to S4 on the basis of the voltage Vin.

The control circuit 100 divides a voltage period of the AC power source 1 into three periods, namely, periods 1 to 3, when generating the gate signals G1 to G4. FIG. 3 explains the relationship between the voltage Vin and the periods 1 to 3. FIG. 3 also shows an electric current Io flowing in the load 4.

The period 1 (first period) is a period in which the voltage Vin is equal to or higher than a first reference voltage. The period 2 (second period) is a period in which the voltage Vin is equal to or lower than a second reference voltage. The period 3 (third period) is a period in which the voltage Vin is lower than the first reference voltage and higher than the second reference voltage.

The first reference voltage is set to a value somewhat higher than 0 V. The second reference voltage is set to a value somewhat lower than 0 V. By setting the first and second reference voltages in such a manner, it is possible to restrict the third period to a period in which the voltage Vin is around zero.

For example, the voltage Vin of the single-phase AC power source 1 is taken as 250 VAC and the output voltage Vo thereof is taken as 200 VAC. The first reference voltage is taken as about 10 V and the second reference voltage is taken as about −10 V. In this case, the deviation (deviation of a fundamental harmonic) of the output voltage Vo occurring at the switching timing of the periods is about 2 V. Where the first and second reference voltages are thus set, only a minor effect is exerted on the waveform distortion of the output voltage Vo.

FIG. 4 explains the relationship between the periods 1 to 3 and the ON/OFF operation of the switching elements S1 to S4.

In the period 1, the control circuit 100 generates gate signals G2, G3 for setting the switching elements S2, S3 to the ON state at all times. The control circuit 100 also generates gate signals G1, G4 for alternately ON/OFF operating the switching elements S1, S4. The gate signals G1, G4 are pulse-width modulated to output a predetermined AC voltage.

When the switching element S1 is switched from ON to OFF and the switching element S4 is switched from OFF to ON, a dead time Td in which both elements are simultaneously OFF is provided to the gate signals G1, G4 of both elements. Likewise, when the switching element S4 is switched from ON to OFF and the switching element S1 is switched from OFF to ON, a dead time Td in which both elements are simultaneously OFF is provided to the gate signals G1, G4 of both elements. The dead time Td is provided to prevent the AC power source 1 from short circuiting caused by simultaneous ON switching of both elements at the timing at which the switching elements S1, S4 are ON/OFF switched.

Where the switching element S1 is switched ON, the electric current Io flows in the path of AC power source 1→switching element S1→load 4→AC power source 1. Where the switching element S1 is switched OFF, the electric current Io which has been flowing in the switching element S1 is commutated to the path of load 4→switching element S3→load 4. Within the dead time Td after the switching element S1 has been switched OFF, the ON period of the switching element S4, and the dead time Td after the switching element S4 has been switched OFF, the electric current Io continues flowing in the path of load 4→switching element S3→load 4. Where the switching element S1 is then switched ON, the current Io which has been flowing in the switching element S3 is commutated to the path of AC power source 1→switching element S1→load 4→AC power source 1.

The polarity of the electric current Io can be negative immediately after switching from the period 3 to the period 1. In this case, the electric current Io flows in the path of AC power source 1→load 4→switching element S2→AC power source 1, or the path of load 4→switching element S4→load 4.

As indicated hereinabove, in the period 1, the commutation operation of the electric current Io is repeated following the ON/OFF operation of the switching elements S1, S4. Thus, the path for releasing the inductive energy accumulated in the reactor L of the load 4 is ensured at all times. Therefore, in the period 1, the surge voltage caused by the inductive energy accumulated in the reactor L can be inhibited.

In the period 2, the control circuit 100 generates gate signals G1, G4 for setting the switching elements S1, S4 to the ON state at all times. The control circuit 100 also generates gate signals G2, G3 for alternately ON/OFF operating the switching elements S2, S3. The gate signals G2, G3 are pulse-width modulated to output a predetermined AC voltage.

When the switching element S2 is switched from ON to OFF and the switching element S3 is switched from OFF to ON, a dead time Td in which both elements are simultaneously OFF is provided to the gate signals G2, G3 of both elements. Likewise, when the switching element S3 is switched from ON to OFF and the switching element S2 is switched from OFF to ON, a dead time Td in which both elements are simultaneously OFF is provided to the gate signals G2, G3 of both elements.

Where the switching element S2 is switched ON, the electric current Io flows in the path of AC power source 1→load 4→switching element S2→AC power source 1. Where the switching element S2 is switched OFF, the electric current Io which has been flowing in the switching element S2 is commutated to the path of load 4→switching element S4→load 4. Within the dead time Td after the switching element S2 has been switched OFF, the ON period of the switching element S3, and the dead time Td after the switching element S3 has been switched OFF, the electric current Io continues flowing in the path of load 4→switching element S4→load 4. Where the switching element S1 is then switched ON, the current Io which has been flowing in the switching element S4 is commutated to the path of AC power source 1→load 4→switching element S2→AC power source 1.

The polarity of the electric current Io can be positive immediately after switching from the period 3 to the period 2. In this case, the electric current Io flows in the path of AC power source 1→switching element S1→load 4→AC power source 1, or the path of load 4→switching element S3→load 4.

As indicated hereinabove, in the period 2, the commutation operation of the electric current Io is repeated following the ON/OFF operation of the switching elements S2, S3. Thus, the path for releasing the inductive energy accumulated in the reactor L of the load 4 is ensured at all times. Therefore, in the period 2, the surge voltage caused by the inductive energy accumulated in the reactor L can be inhibited.

In the period 3, the control circuit 100 sets the switching elements S1, S2 to the ON state at all times and sets the switching elements S3, S4 to the OFF state at all times.

In the period 3 after the period 1, the electric current Io flows in the path of AC power source 1→switching element S1→load 4→AC power source 1. In the period 3 after the period 2, the electric current Io flows in the path of AC power source 1→load 4→switching element S2→AC power source 1. The ON/OFF operation of the switching elements does not occur in either of the cases. Therefore, the surge voltage caused by the inductive energy accumulated in the reactor L is not generated in the period 3.

The switching from the period 1 to the period 3 is preferably performed at a timing at which the switching elements S1 and S2 are simultaneously ON. Likewise, the switching from the period 2 to the period 3 is also preferably performed at a timing at which the switching elements S1 and S2 are simultaneously ON. Where the periods are switched at such timing, the transition to the period 3 can be made while maintaining the ON/OFF state of the switching elements in the period 1 or period 2. Further, since the ON/OFF operation of the switching elements is not switched, it is not necessary to insert a dead time at this timing.

It follows from the above, that in the first embodiment provided with the period 3 close the zero cross of the AC power source 1, the occurrence of a surge voltage caused by the inductive energy accumulated in the reactor L can be inhibited. Further, in the present embodiment, it is not necessary to generate a complex gate signal at the switching timing of the periods.

Figure 5:
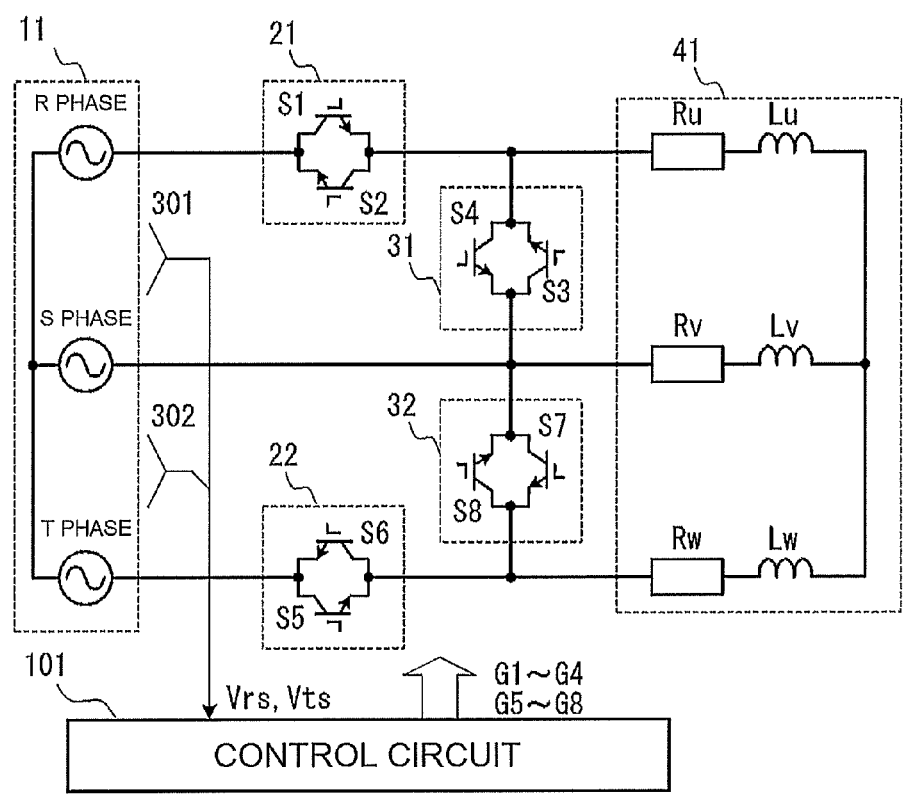
FIG. 5 is an explanatory drawing showing the second embodiment of the invention.

FIG. 5 is an explanatory drawing illustrating the second embodiment of the present invention. This embodiment is a step-down chopper in which two single-phase step-down choppers according to the first embodiment are used, and a three-phase AC power source and a three-phase load are V-connected.

In the figure, the reference numeral 11 stands for a three-phase AC power source, 21, 22 and 31, 32—bidirectional switches, 41—a three-phase load, and 101—a control circuit.

In the figure, the AC power source 11 is a three-phase AC power source in which R-phase, S-phase, and T-phase power sources are Y-connected. The load 41 is a three-phase load in which a serial circuit (U-phase load) of a resistor Ru and a reactor Lu, a serial circuit (V-phase load) of a resistor Rv and a reactor Lv, and a serial circuit (W-phase load) of a resistor Rw and a reactor Lw are Y-connected.

The serial circuit of the bidirectional switches 21, 31 is connected between the R-phase terminal and S-phase terminal of the AC power source 11. The U-phase load and V-phase load of the load 41 are connected in series to both terminals of the bidirectional switch 31. The configuration of the bidirectional switches 21, 31 and the serial circuit constituted thereby are similar to the configuration of the bidirectional switches 2, 3 and the serial circuit constituted thereby in the first embodiment, and the detailed explanation thereof is herein omitted.

The serial circuit of the bidirectional switches 22, 32 is connected between the T-phase terminal and S-phase terminal of the AC power source 11. The W-phase load and V-phase load of the load 41 are connected in series to both terminals of the bidirectional switch 32. The configuration of the bidirectional switches 22, 32 and the serial circuit constituted thereby are similar to the configuration of the bidirectional switches 2, 3 and the serial circuit constituted thereby in the first embodiment, and the detailed explanation thereof is herein omitted.

The reference numeral 301 stands for a voltage detector that detects an inter-line voltage Vrs between the R phase and S phase of the AC power source 11. The reference numeral 302 stands for a voltage detector that detects an inter-line voltage Vts between the T phase and S phase of the AC power source 11. The inter-line voltage Vrs detected by the voltage detector 301 and the inter-line voltage Vts detected by the voltage detector 302 are inputted to the control circuit 101.

The control circuit 101 divides the voltage period of the inter-line voltage Vrs into periods 1 to 3 and generates gate signals G1 to G4 of switching elements S1 to S4. The control circuit 101 also divides the voltage period of the inter-line voltage Vts into periods 1 to 3 and generates gate signals G5 to G8 of switching elements S5 to S8. The logic by which the control circuit 101 generates the gate signals G1 to G4 and the logic by which the control circuit generates the gate signals G5 to G8 are similar to those of the first embodiment, and the explanation thereof is herein omitted.

In the present embodiment, the period 3 is also provided close to the zero cross of the inter-line voltages Vrs, Vts. Therefore, in the present embodiment, the occurrence of surge voltage caused by the inductive energy accumulated in the reactors Lu, Lv, and Lw of the load 41 can be inhibited. Further, in the present embodiment, it is not necessary to generate a complex gate signal at the switching timing of the periods.

Figure 6:
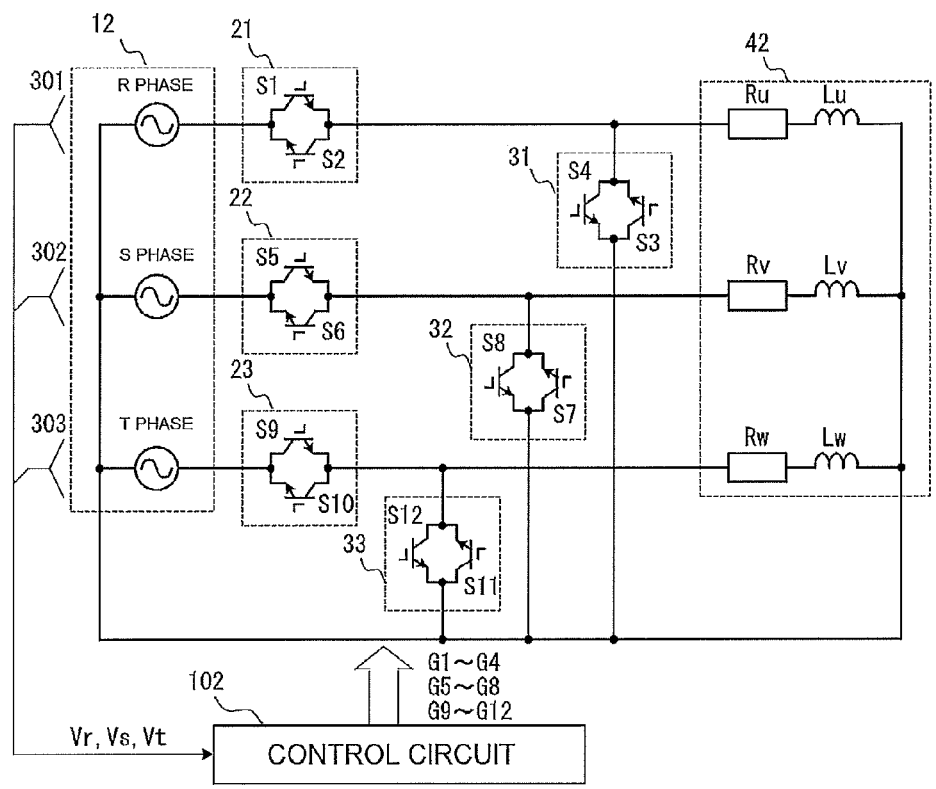
FIG. 6 is an explanatory drawing showing the third embodiment of the invention.

FIG. 6 is an explanatory drawing illustrating the third embodiment of the present invention. This embodiment is a step-down chopper in which three single-phase step-down choppers according to the first embodiment are used, and a three-phase AC power source and a three-phase load are Y-connected.

In the figure, the reference numeral 12 stands for a three-phase AC power source, 21 to 23 and 31 to 33—bidirectional switches, 42—a three-phase load, and 102—a control circuit.

In the figure, the AC power source 12 is a three-phase AC power source in which R-phase, S-phase, and T-phase power sources are Y-connected; this AC power source has a neutral point. The load 42 is a three-phase load in which a serial circuit (U-phase load) of a resistor Ru and a reactor Lu, a serial circuit (V-phase load) of a resistor Rv and a reactor Lv, and a serial circuit (W-phase load) of a resistor Rw and a reactor Lw are Y-connected. The load 42 also has a neutral point. The neutral point of the AC power source 12 and the neutral point of the load 42 are connected to each other.

The serial circuit of the bidirectional switches 21, 31 is connected between the R-phase terminal and the neutral terminal of the AC power source 12. The U-phase load of the load 42 is connected to both terminals of the bidirectional switch 31. The configuration of the bidirectional switches 21, 31 and the serial circuit constituted thereby are similar to the configuration of the bidirectional switches 2, 3 and the serial circuit constituted thereby in the first embodiment, and the detailed explanation thereof is herein omitted.

The serial circuit of the bidirectional switches 22, 32 is connected between the S-phase terminal and the neutral terminal of the AC power source 11. The V-phase load of the load 42 are connected to both terminals of the bidirectional switch 32. The configuration of the bidirectional switches 22, 32 and the serial circuit constituted thereby are similar to the configuration of the bidirectional switches 2, 3 and the serial circuit constituted thereby in the first embodiment, and the detailed explanation thereof is herein omitted.

The serial circuit of the bidirectional switches 23, 33 is connected between the T-phase terminal and the neutral terminal of the AC power source 11. The W-phase load of the load 42 are connected to both terminals of the bidirectional switch 33. The configuration of the bidirectional switches 23, 33 and the serial circuit constituted thereby are similar to the configuration of the bidirectional switches 2, 3 and the serial circuit constituted thereby in the first embodiment, and the detailed explanation thereof is herein omitted.

The reference numeral 301 stands for a voltage detector that detects an R-phase voltage Vr of the AC power source 11. The reference numeral 302 stands for a voltage detector that detects an S-phase voltage Vs of the AC power source 11. The reference numeral 303 stands for a voltage detector that detects a T-phase voltage Vt of the AC power source 11. The voltage Vr detected by the voltage detector 301, the voltage Vs detected by the voltage detector 302, and the voltage Vt detected by the voltage detector 303 are inputted to the control circuit 102.

The control circuit 102 divides the voltage period of the voltage Vr into periods 1 to 3 and generates gate signals G1 to G4 of switching elements S1 to S4. The control circuit 102 also divides the voltage period of the voltage Vs into periods 1 to 3 and generates gate signals G5 to G8 of switching elements S5 to S8. The control circuit 102 also divides the voltage period of the voltage Vt into periods 1 to 3 and generates gate signals G9 to G12 of switching elements S9 to S12. The logic by which the control circuit 102 generates the gate signals G1 to G4, the logic by which the control circuit generates the gate signals G5 to G8, and the logic by which the control circuit generates the gate signals G9 to G12 in the periods 1 to 3 are similar to those of the first embodiment, and the explanation thereof is herein omitted.

In the present embodiment, the period 3 is also provided close to the zero cross of the voltages Vr, Vs, and Vt. Therefore, in the present embodiment, the occurrence of surge voltage caused by the inductive energy accumulated in the reactors Lu, Lv, and Lw of the load 42 can be inhibited. Further, in the present embodiment, it is not necessary to generate a complex gate signal at the switching timing of the periods.

Figure 7:
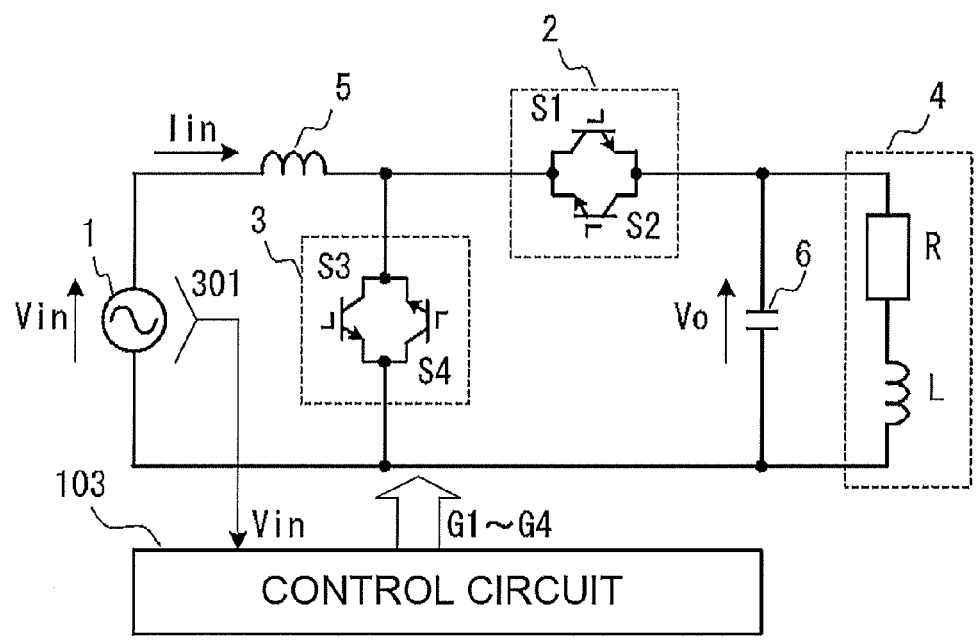
FIG. 7 is an explanatory drawing showing the fourth embodiment of the present invention.

FIG. 7 is an explanatory drawing illustrating the fourth embodiment of the power conversion device using the present invention.

In the figure, the reference numeral 1 stands for a single-phase AC power source, 2 and 3—bidirectional switches, 4—a load, 5—a reactor, 6—a capacitor, and 103—a control circuit. The power conversion device of this embodiment is a step-up chopper that steps up the voltage Vin of the single-phase AC power source 1 and supplies the obtained voltage Vo to the load.

The bidirectional switch 2 (first bidirectional switch) is a circuit in which the switching element S1 (first switching element) and the switching element S2 (second switching element) are connected reversely in parallel. The collector terminal side of the switching element S1 is taken as the first terminal of the bidirectional switch 2, and the emitter terminal side of the switching element S1 is taken as the second terminal of the bidirectional switch 2.

The bidirectional switch 3 (second bidirectional switch) is a circuit in which the switching element S3 (third switching element) and the switching element S4 (fourth switching element) are connected reversely in parallel. The collector terminal side of the switching element S4 is taken as the first terminal of the bidirectional switch 3, and the emitter terminal side of the switching element S4 is taken as the second terminal of the bidirectional switch 3.

The switching elements S1 to S4 are IGBT having a reverse blocking voltage.

The reactor 5 and the bidirectional switch 3 are connected in series to both terminals of the AC power source 1. More specifically, one terminal of the reactor 5 is connected to one terminal of the AC power source 1, and the other terminal of the reactor 5 is connected to the second terminal of the bidirectional switch 3. The first terminal of the bidirectional switch 3 is connected to the other terminal of the AC power source 1.

The bidirectional switch 2 and the capacitor 6 are connected in series with each other and in parallel with the bidirectional switch 3. More specifically, the first terminal of the bidirectional switch 2 is connected to the second terminal of the bidirectional switch 3. One terminal of the capacitor 6 is connected to the second terminal of the bidirectional switch 2, and the other terminal of the capacitor 6 is connected to the first terminal of the bidirectional switch 3.

The load 4 is connected in parallel with the capacitor 6. The load 4 is a circuit in which the resistor R and the reactor L are connected in series. The reactor L includes the inductance component of the resistor R or the inductance component of a wiring.

The voltage Vin of the AC power source 1, which has been detected by the voltage detector 301 is inputted to the control circuit 103. The control circuit 103 generates gate signals G1 to G4 for ON/OFF switching the switching elements S1 to S4 on the basis of the voltage Vin.

When the gate signals G1 to G4 are generated, the control circuit 103 divides the voltage period of the AC power source 1 into three periods, namely, periods 4 to 6, in the same manner as in the first embodiment. The period 4 (fourth period) is a period in which the voltage Vin is equal to or higher than a first reference voltage. The period 5 (fifth period) is a period in which the voltage Vin is equal to or lower than a second reference voltage. The period 6 (sixth period) is a period in which the voltage Vin is lower than the first reference voltage and higher than the second reference voltage.

The first reference voltage is set to a value somewhat higher than 0 V. The second reference voltage is set to a value somewhat lower than 0 V. By setting the first and second reference voltages in such a manner, it is possible to restrict the sixth period to a period in which the voltage Vin is around zero.

For example, the voltage Vin of the single-phase AC power source 1 is taken as 150 VAC and the output voltage Vo thereof is taken as 200 VAC. The first reference voltage is taken as about 10 V and the second reference voltage is taken as about −10 V. In this case, the deviation (deviation of a fundamental harmonic) of the output voltage Vo occurring at the switching timing of the periods is about 3 V. Where the first and second reference voltages are thus set, a minor effect is produced on the waveform distortion of the output voltage Vo.

Figure 8:
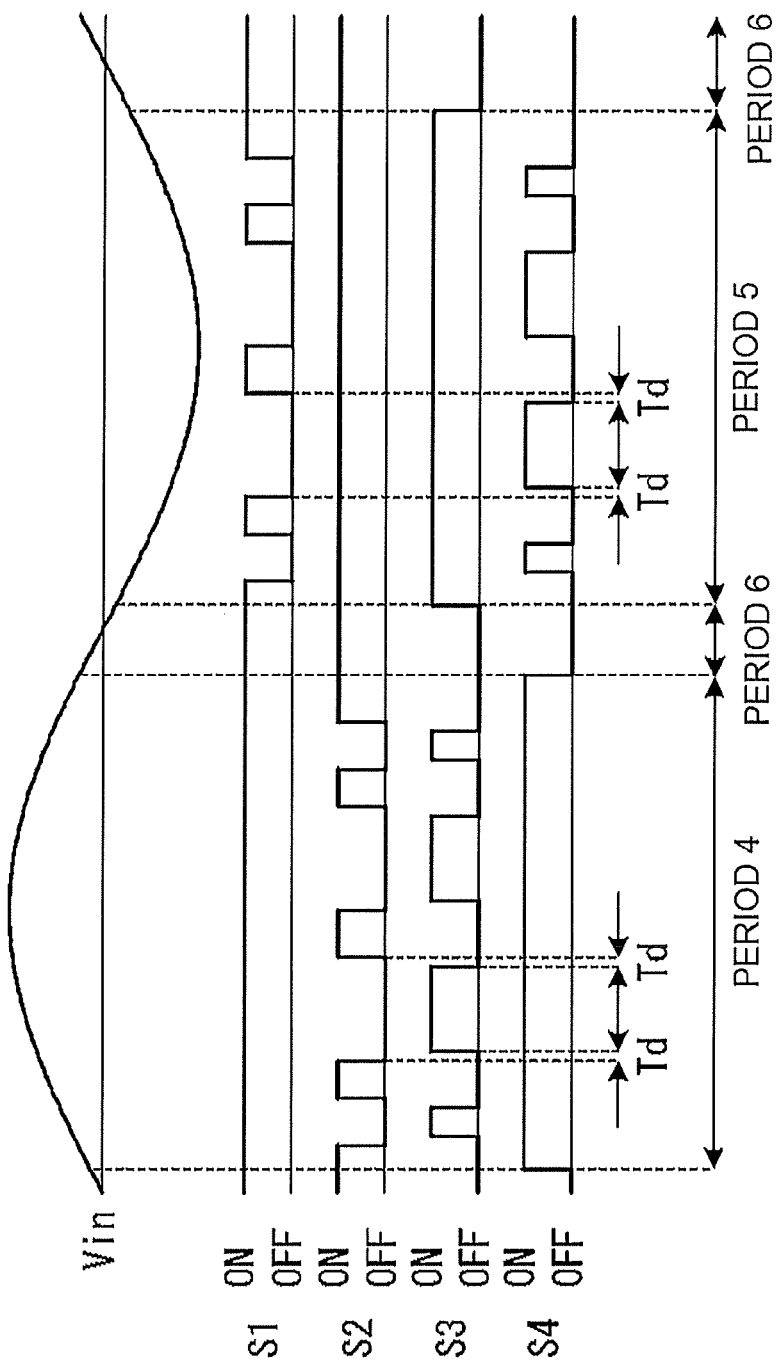
FIG. 8 is an explanatory drawing showing the relationship between the voltage Vin and the periods 4 to 6.

FIG. 8 explains the relationship between the periods 4 to 6 and the ON/OFF operation of the switching elements S1 to S4.

In the period 4, the control circuit 103 generates gate signals G1, G4 for setting the switching elements S1, S4 to the ON state at all times. The control circuit 103 also generates gate signals G2, G3 for alternately ON/OFF operating the switching elements S2, S3. The gate signals G2, G3 are pulse-width modulated to output a predetermined AC voltage.

When the switching element S2 is switched from ON to OFF and the switching element S3 is switched from OFF to ON, a dead time Td in which both elements are simultaneously OFF is provided to the gate signals G2, G3 of both elements. Likewise, when the switching element S3 is switched from ON to OFF and the switching element S2 is switched from OFF to ON, a dead time Td in which both elements are simultaneously OFF is provided to the gate signals G2, G3 of both elements. The dead time Td is provided to prevent the capacitor 6 from short circuiting caused by simultaneous ON switching of both elements at the timing at which the switching elements S2, S3 are ON/OFF switched.

Where the switching element S3 is switched ON, the electric current Iin flows in the path of AC power source 1→reactor 5→switching element S3→AC power source 1. Where the switching element S3 is switched OFF, the electric current Iin which has been flowing in the switching element S3 is commutated to the path of AC power source 1→reactor 5→switching element S1→load 4→AC power source 1. Within the dead time Td after the switching element S3 has been switched OFF, the ON period of the switching element S2, and the dead time Td after the switching element S2 has been switched OFF, the electric current Iin continues flowing in the path of AC power source 1→reactor 5→switching element S1→load 4→AC power source 1. Where the switching element S3 is then switched ON, the current Iin which has been flowing in the switching element S1 is commutated to the path of AC power source 1→reactor 5→switching element S3→AC power source 1.

The polarity of the electric current Iin can be negative immediately after switching from the period 6 to the period 4. In this case, the electric current Iin flows in the path of AC power source 1→load 4→switching element S2→AC power source 1, or the path of AC power source 1→switching element S4→reactor 5→AC power source 1.

As indicated hereinabove, in the period 4, the commutation operation of the electric current Iin is repeated following the ON/OFF operation of the switching elements S2, S3. Thus, the path for releasing the inductive energy accumulated in the reactor 5 is ensured at all times. Therefore, in the period 4, the surge voltage caused by the inductive energy accumulated in the reactor 5 can be inhibited.

In the period 5, the control circuit 103 generates gate signals G2, G3 for setting the switching elements S2, S3 to the ON state at all times. The control circuit 103 also generates gate signals G1, G4 for alternately ON/OFF operating the switching elements S1, S4. The gate signals G1, G4 are pulse-width modulated to output a predetermined AC voltage.

When the switching element S1 is switched from ON to OFF and the switching element S4 is switched from OFF to ON, a dead time Td in which both elements are simultaneously OFF is provided to the gate signals G1, G4 of both elements. Likewise, when the switching element S4 is switched from ON to OFF and the switching element S1 is switched from OFF to ON, a dead time Td in which both elements are simultaneously OFF is provided to the gate signals G1, G4 of both elements.

Where the switching element S4 is switched ON, the electric current Iin flows in the path of AC power source 1→switching element S4→reactor 5→AC power source 1. Where the switching element S4 is switched OFF, the electric current Iin which has been flowing in the switching element S4 is commutated to the path of AC power source 1→load 4→switching element S2→reactor 5→AC power source 1. Within the dead time Td after the switching element S2 has been switched OFF, the ON period of the switching element S3, and the dead time Td after the switching element S3 has been switched OFF, the electric current Io continues flowing in the path of load 4→switching element S4→load 4. Where the switching element S1 is then switched ON, the current Io which has been flowing in the switching element S4 is commutated to the path of AC power source 1→load 4→switching element S2→AC power source 1.

The polarity of the electric current Iin can be positive immediately after switching from the period 6 to the period 5. In this case, the electric current Iin flows in the path of AC power source 1→switching element S1→load 4→AC power source 1, or the path of AC power source 1→reactor 5→switching element S3→AC power source 1.

As indicated hereinabove, in the period 5, the commutation operation of the electric current Iin is repeated following the ON/OFF operation of the switching elements S1, S4. Thus, the path for releasing the inductive energy accumulated in the reactor 5 is ensured at all times. Therefore, in the period 5, the surge voltage caused by the inductive energy accumulated in the reactor L can be inhibited.

In the period 6, the control circuit 103 sets the switching elements S1, S2 to the ON state at all times and sets the switching elements S3, S4 to the OFF state at all times.

In the period 6 after the period 4, the electric current Iin flows in the path of AC power source 1→reactor 5→switching element S1→load 4→AC power source 1. In the period 6 after the period 5, the electric current Iin flows in the path of AC power source 1→load 4→switching element S2→reactor 5→AC power source 1→. The ON/OFF operation of the switching elements does not occur in either of the cases. Therefore, the surge voltage caused by the inductive energy accumulated in the reactor 5 is not generated in the period 6.

The switching from the period 4 to the period 6 is preferably performed at a timing at which the switching elements S1 and S2 are simultaneously ON. Likewise, the switching from the period 5 to the period 6 is also preferably performed at a timing at which the switching elements S1 and S2 are simultaneously ON. Where the periods are switched at such timing, the transition to the period 3 can be made while maintaining the ON/OFF state of the switching elements in the period 1 or period 2. Further, since the ON/OFF operation of the switching elements is not switched, it is not necessary to generate a complex gate signal, e.g. to insert a dead time at this timing.

It follows from the above, that in the fourth embodiment provided with the period 6 close the zero cross of the AC power source 1, the occurrence of a surge voltage caused by the inductive energy accumulated in the reactor 5 can be inhibited. Further, in the present embodiment, it is not necessary to generate a complex gate signal at the switching timing of the periods.

Figure 9:
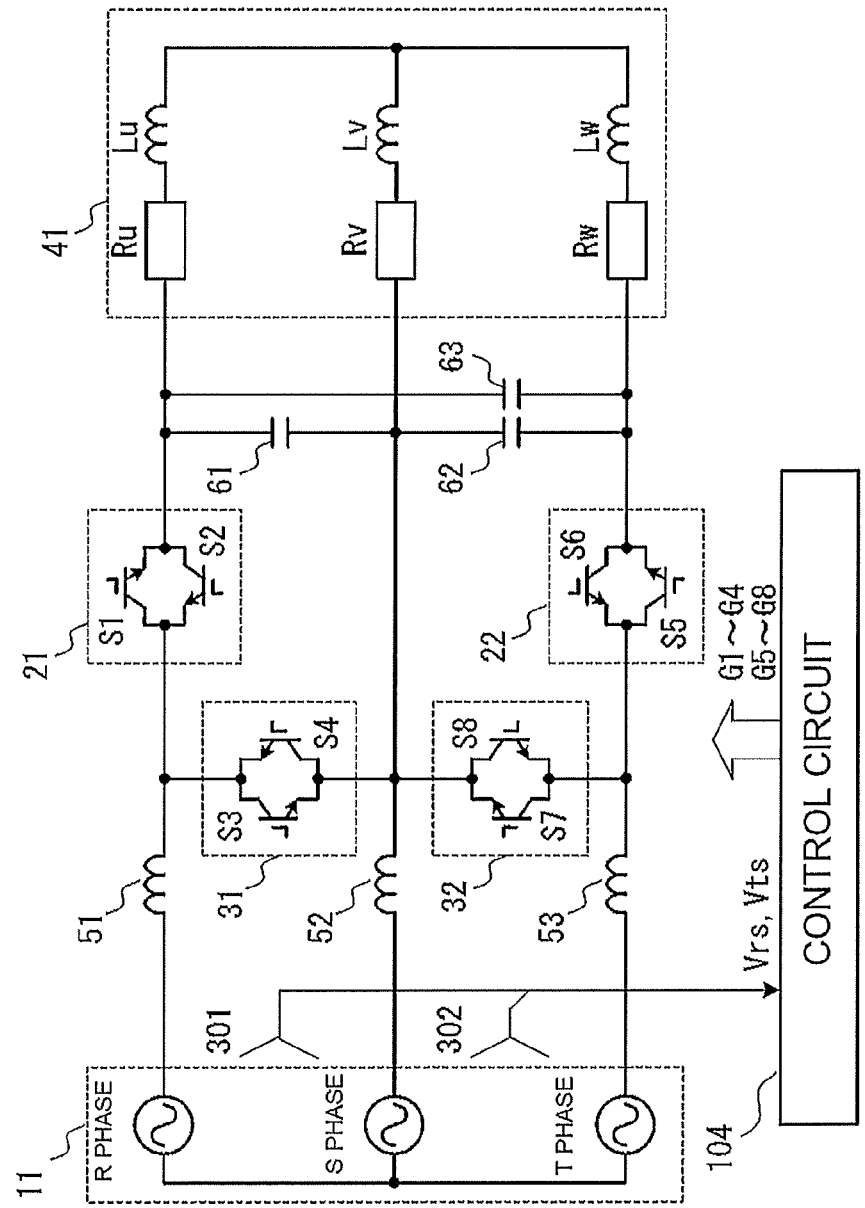
FIG. 9 is an explanatory drawing showing the fifth embodiment of the present invention.

FIG. 9 is an explanatory drawing illustrating the fifth embodiment of the present invention. This embodiment is a step-up chopper in which two single-phase step-up choppers according to the fourth embodiment are used, and a three-phase AC power source and a three-phase load are V-connected.

In the figure, the reference numeral 11 stands for a three-phase AC power source, 21, 22 and 31, 32—bidirectional switches, 41—a three-phase load, 51 to 53—reactors, 61 to 63—capacitors, and 104—a control circuit.

The AC power source 11 is a three-phase AC power source in which R-phase, S-phase, and T-phase power sources are Y-connected. The load 41 is a three-phase load in which a serial circuit (U-phase load) of a resistor Ru and a reactor Lu, a serial circuit (V-phase load) of a resistor Rv and a reactor Lv, and a serial circuit (W-phase load) of a resistor Rw and a reactor Lw are Y-connected.

The serial circuit constituted by the reactor 51 and the bidirectional switch 31 is connected, through the reactor 52, between the R-phase terminal and S-phase terminal of the AC power source 11. The serial circuit constituted by the bidirectional switch 21 and the capacitor 61 is connected to both terminals of the bidirectional switch 31. The configurations of the bidirectional switch 31 and the serial circuit constituted by the reactor 51 and the bidirectional switch 31 are similar to the configurations of the bidirectional switch 3 and the serial circuit constituted by the reactor 5 and the bidirectional switch 3 in the fourth embodiment, and the detailed explanation thereof is herein omitted. The configurations of the bidirectional switch 21 and the serial circuit constituted by the bidirectional switch 21 and the capacitor 61 are similar to the configurations of the bidirectional switch 2 and the serial circuit constituted by the bidirectional switch 2 and the capacitor 6 in the fourth embodiment, and the detailed explanation thereof is herein omitted.

The U-phase load and V-phase load of the load 41 are connected in series to both terminals of the capacitor 61.

The serial circuit constituted by the reactor 53 and the bidirectional switch 32 is connected, through the reactor 52, between the T-phase terminal and S-phase terminal of the AC power source 11. The serial circuit constituted by the bidirectional switch 22 and the capacitor 63 is connected to both terminals of the bidirectional switch 32. The configurations of the bidirectional switch 32 and the serial circuit constituted by the reactor 53 and the bidirectional switch 32 are similar to the configurations of the bidirectional switch 3 and the serial circuit constituted by the reactor 5 and the bidirectional switch 3 in the fourth embodiment, and the detailed explanation thereof is herein omitted. The configurations of the bidirectional switch 22 and the serial circuit constituted by the bidirectional switch 22 and the capacitor 62 are similar to the configurations of the bidirectional switch 2 and the serial circuit constituted by the bidirectional switch 2 and the capacitor 6 in the fourth embodiment, and the detailed explanation thereof is herein omitted.

The W-phase load and V-phase load of the load 41 are connected in series to both terminals of the capacitor 62.

Further, the capacitor 63 is connected to both terminals of the series circuit of the capacitors 61 and 62.

The reference numeral 301 stands for a voltage detector that detects an inter-line voltage Vrs between the R phase and S phase of the AC power source 11. The reference numeral 302 stands for a voltage detector that detects an inter-line voltage Vts between the T phase and S phase of the AC power source 11. The inter-line voltage Vrs detected by the voltage detector 301 and the inter-line voltage Vts detected by the voltage detector 302 are inputted to the control circuit 104.

The control circuit 104 divides the voltage period of the inter-line voltage Vrs into periods 4 to 6 and generates gate signals G1 to G4 of switching elements S1 to S4. The control circuit 104 also divides the voltage period of the inter-line voltage Vts into periods 4 to 6 and generates gate signals G5 to G8 of switching elements S5 to S8. The logic by which the control circuit 104 generates the gate signals G1 to G4 and the logic by which the control circuit generates the gate signals G5 to G8 are similar to those of the fourth embodiment, and the explanation thereof is herein omitted.

In the present embodiment, the period 6 is also provided close to the zero cross of the inter-line voltages Vrs, Vts. Therefore, in the present embodiment, the occurrence of surge voltage caused by the inductive energy accumulated in the reactors 51 to 53 can be inhibited. Further, in the present embodiment, it is not necessary to generate a complex gate signal at the switching timing of the periods.

Figure 10:
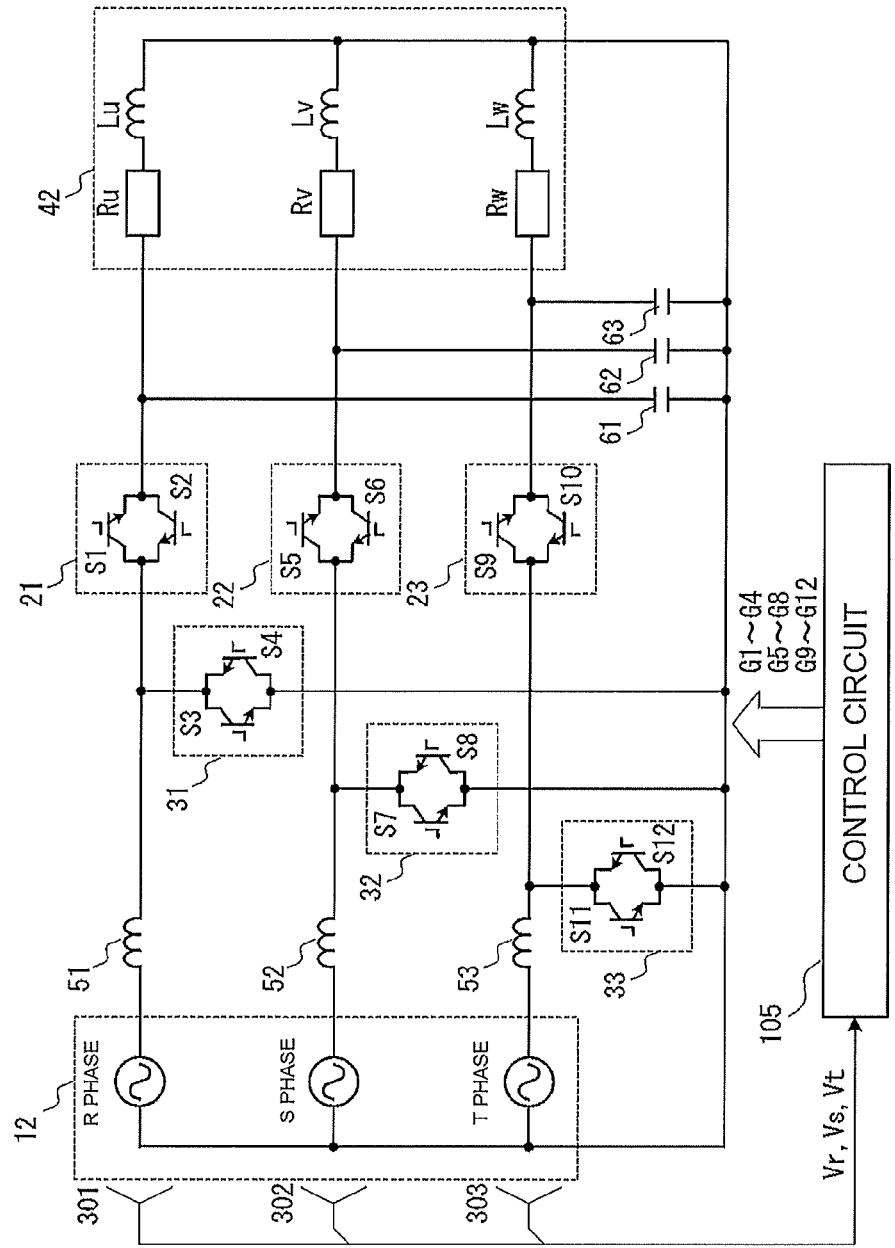
FIG. 10 is an explanatory drawing showing the sixth embodiment of the present invention.
Figure 11:
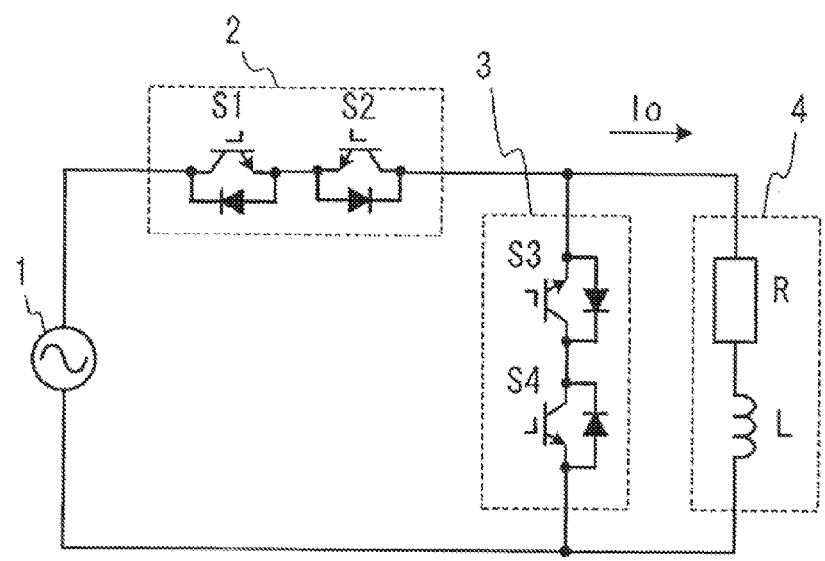
FIG. 11 is an explanatory drawing showing a step-down AC chopper according to the related art.
Figure 12:
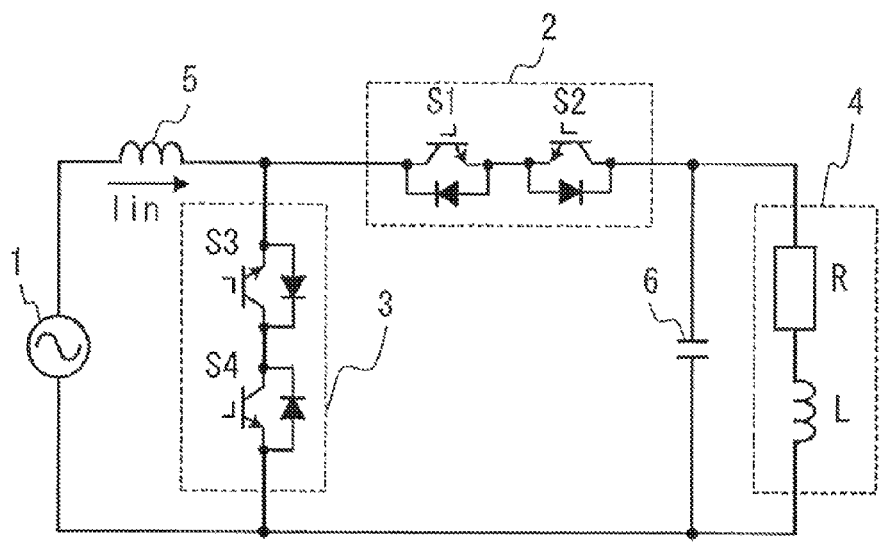
FIG. 12 is an explanatory drawing showing a step-up AC chopper according to the related art.

FIG. 10 is an explanatory drawing illustrating the sixth embodiment of the present invention. This embodiment is a step-up chopper in which three single-phase step-up choppers according to the fourth embodiment are used, and a three-phase AC power source and a three-phase load are Y-connected.

In the figure, the reference numeral 12 stands for a three-phase AC power source, 21 to 23 and 31 to 33—bidirectional switches, 42—a three-phase load, 51 to 53—reactors, 61 to 63—capacitors, and 105—a control circuit.

The AC power source 12 is a three-phase AC power source in which R-phase, S-phase, and T-phase power sources are Y-connected; this AC power source has a neutral point. The load 42 is a three-phase load in which a serial circuit (U-phase load) of a resistor Ru and a reactor Lu, a serial circuit (V-phase load) of a resistor Rv and a reactor Lv, and a serial circuit (W-phase load) of a resistor Rw and a reactor Lw are Y-connected. The load 42 also has a neutral point. The neutral terminal of the AC power source 12 and the neutral point of the load 42 are connected to each other.

The serial circuit of the reactor 51 and the bidirectional switch 31 is connected between the R-phase terminal and the neutral point of the AC power source 12. The serial circuit of the bidirectional switch 21 and the capacitor 61 is connected to both terminals of the bidirectional switch 31. The U-phase load of the load 42 is connected to both terminals of the capacitor 61. The configurations of the bidirectional switch 31 and the serial circuit constituted by the reactor 51 and the bidirectional switch 31 are similar to the configurations of the bidirectional switch 3 and the serial circuit constituted by the reactor 5 and the bidirectional switch 3 in the fourth embodiment, and the detailed explanation thereof is herein omitted. The configurations of the bidirectional switch 21 and the serial circuit constituted by the bidirectional switch 21 and the capacitor 61 are similar to the configurations of the bidirectional switch 2 and the serial circuit constituted by the bidirectional switch 2 and the capacitor 6 in the fourth embodiment, and the detailed explanation thereof is herein omitted.

The serial circuit of the reactor 52 and the bidirectional switch 32 is connected between the S-phase terminal and the neutral terminal of the AC power source 12. The serial circuit of the bidirectional switch 22 and the capacitor 62 is connected to both terminals of the bidirectional switch 32. The V-phase load of the load 42 is connected to both terminals of the capacitor 62. The configurations of the bidirectional switch 32 and the serial circuit constituted by the reactor 52 and the bidirectional switch 32 are similar to the configurations of the bidirectional switch 3 and the serial circuit constituted by the reactor 5 and the bidirectional switch 3 in the fourth embodiment, and the detailed explanation thereof is herein omitted. The configurations of the bidirectional switch 22 and the serial circuit constituted by the bidirectional switch 22 and the capacitor 62 are similar to the configurations of the bidirectional switch 2 and the serial circuit constituted by the bidirectional switch 2 and the capacitor 6 in the fourth embodiment, and the detailed explanation thereof is herein omitted.

The serial circuit of the reactor 53 and the bidirectional switch 33 is connected between the T-phase terminal and the neutral terminal of the AC power source 12. The serial circuit of the bidirectional switch 23 and the capacitor 63 is connected to both terminals of the bidirectional switch 33. The W-phase load of the load 42 is connected to both terminals of the capacitor 63. The configurations of the bidirectional switch 33 and the serial circuit constituted by the reactor 53 and the bidirectional switch 33 are similar to the configurations of the bidirectional switch 3 and the serial circuit constituted by the reactor 5 and the bidirectional switch 3 in the fourth embodiment, and the detailed explanation thereof is herein omitted. The configurations of the bidirectional switch 23 and the serial circuit constituted by the bidirectional switch 23 and the capacitor 63 are similar to the configurations of the bidirectional switch 2 and the serial circuit constituted by the bidirectional switch 2 and the capacitor 6 in the fourth embodiment, and the detailed explanation thereof is herein omitted.

The reference numeral 301 stands for a voltage detector that detects an R-phase voltage Vr of the AC power source 11. The reference numeral 302 stands for a voltage detector that detects an S-phase voltage Vs of the AC power source 11. The reference numeral 303 stands for a voltage detector that detects a T-phase voltage Vt of the AC power source 11. The voltage Vr detected by the voltage detector 301, the voltage Vs detected by the voltage detector 302, and the voltage Vt detected by the voltage detector 303 are inputted to the control circuit 105.

The control circuit 105 divides the voltage period of the voltage Vr into periods 4 to 6 and generates gate signals G1 to G4 of switching elements S1 to S4. The control circuit 105 also divides the voltage period of the voltage Vs into periods 4 to 6 and generates gate signals G5 to G8 of switching elements S5 to S8. The control circuit 105 also divides the voltage period of the voltage Vt into periods 4 to 6 and generates gate signals G9 to G12 of switching elements S9 to S12. The logic by which the control circuit 105 generates the gate signals G1 to G4, the logic by which the control circuit generates the gate signals G5 to G8, and the logic by which the control circuit generates the gate signals G9 to G12 in the periods 4 to 6 are similar to those of the first embodiment, and the explanation thereof is herein omitted.

In the present embodiment, the period 6 is also provided close to the zero cross of the voltages Vr, Vs, and Vt. Therefore, in the present embodiment, the occurrence of surge voltage caused by the inductive energy accumulated in the reactors Lu, Lv, and Lw of the load 42 can be inhibited. Further, in the present embodiment, it is not necessary to generate a complex gate signal at the switching timing of the periods.

INDUSTRIAL APPLICABILITY

The present invention can be used in AC choppers that step down or up the voltage of an AC power source and output the resultant AC voltage.

EXPLANATION OF REFERENCE NUMERALS

1 single-phase AC power source
11, 12 three-phase AC power sources
2, 21 to 23 bidirectional switches
3, 31 to 33 bidirectional switches
4 single-phase load
41, 42 three-phase loads
5, 51 to 53 reactors
6, 61 to 63 capacitors
100 to 105 control circuits
301 to 303 voltage detectors

The invention claimed is:

1. A power conversion apparatus for connection to a pair of terminals of an AC power source to supply an AC voltage to a load, comprising:
    a first bidirectional switch that includes a first switching element and a second switching element connected in series or in parallel; and
    a second bidirectional switch that includes a third switching element and a fourth switching element connected in series or in parallel, the second bidirectional switch being connected to the load,
    wherein a voltage period of the AC power source is divided into a first period in which the voltage of the AC power source is equal to or higher than a first reference voltage that is higher than zero, a second period in which the voltage of the AC power source is equal to or lower than a second reference voltage that is lower than zero, and a third period in which the voltage of the AC power source is between the first reference voltage and the second reference voltage;
    wherein in the first period, the second and third switching elements are switched ON, and the first and fourth switching elements are alternately switched ON/OFF;
    wherein in the second period, the first and fourth switching elements are switched ON, and the second and third switching elements are alternately switched ON/OFF;
    wherein in the third period, the first and second switching elements are switched ON, and the third and fourth switching elements are switched OFF; and
    wherein the voltage of the AC power source is stepped down to a predetermined AC voltage, and supplied to the load.

2. The power conversion apparatus according to claim 1, wherein switching from the first period to the third period and switching from the second period to the third period are performed when the first and second switching element are simultaneously ON.

3. A power conversion apparatus wherein a three-phase AC power source and a three-phase load are V-connected in use of two power conversion apparatuses according to claim 1.

4. A power conversion apparatus wherein a three-phase AC power source and a three-phase load are V-connected in use of two power conversion apparatuses according to claim 2.

5. A power conversion apparatus wherein a three-phase AC power source and a three-phase load are Y-connected in use of two power conversion apparatuses according to claim 2.

6. A power conversion apparatus for connection to a pair of terminals of an AC power source to supply an AC voltage to a load, comprising:
    a reactor;
    a first bidirectional switch that includes a first switching element and a second switching element connected in series or in parallel;
    a second bidirectional switch that includes a third switching element and a fourth switching element connected in series or in parallel, the second bidirectional switch and the reactor being connected in series to the pair of terminals of the AC power source; and
    a capacitor, the capacitor, and the second bidirectional switch being connected in series across the first bidirectional switch,
    wherein a voltage period of the AC power source is divided into a first period in which the voltage of the AC power source is equal to or higher than a first reference voltage that is higher than zero, a second period in which the voltage of the AC power source is equal to or lower than a second reference voltage that is lower than zero, and a third period in which the voltage of the AC power source is between the first reference voltage and the second reference voltage;
    wherein in the first period, the first and fourth switching elements are switched ON, and the second and third switching elements are alternately switched ON/OFF;
    wherein in the second period, the second and third switching elements are switched ON, and the first and fourth switching elements are alternately switched ON/OFF;
    wherein in the third period, the first and second switching elements are switched ON, and the third and fourth switching elements are switched OFF; and
    wherein the voltage of the AC power source is stepped up to a predetermined AC voltage, and supplied to the load.

7. The power conversion apparatus according to claim 6, wherein switching from the first period to the third period and switching from the second period to the third period are performed when the first and second switching element are simultaneously ON.

8. A power conversion apparatus wherein a three-phase AC power source and a three-phase load are V-connected in use of two power conversion apparatuses according to claim 6.

9. A power conversion apparatus wherein a three-phase AC power source and a three-phase load are Y-connected in use of three power conversion apparatuses according to claim 7.

* * * * *